United States Patent
Brunie et al.

[15] 3,681,447
[45] Aug. 1, 1972

[54] PROCESS FOR PRODUCING 6-HYDROPEROXHEXANOIC ACID

[72] Inventors: Jean-Claude Brunie; Michel Constantini; Noel Crenne, all of Lyon; Michel Jouffret, Villeurbanne, all of France

[73] Assignee: Rhone-Poulenc S.A., Paris, France

[22] Filed: Oct. 8, 1969

[21] Appl. No.: 864,884

[30] Foreign Application Priority Data

Oct. 11, 1968 France..................68169636

[52] U.S. Cl. .......260/533 C, 260/88.7 D, 260/526 R
[51] Int. Cl..............................C07c 73/06
[58] Field of Search..............260/526 R, 478, 533 C

[56] References Cited

UNITED STATES PATENTS 3,551,482   6/1966   Gey et al..................260/533

*Primary Examiner*—James A. Patten
*Attorney*—Stevens, Davis, Miller & Mosher

[57] ABSTRACT

6-Hydroperoxyhexanoic acid, useful for introducing acidic groups into polymers is made by extracting oxidation products of cyclohexane with oxygen in the absence of a metallic catalyst with water, and re-extracting the said acid from the aqueous extract with a water-immiscible alcohol, ester or ketone.

6 Claims, No Drawings

PROCESS FOR PRODUCING 6-HYDROPEROXHEXANOIC ACID

The present invention relates to a process for producing 6-hydroperoxyhexanoic acid.

It is known to oxidize cyclohexane with gas mixtures containing molecular oxygen to give solutions in which the nature and proportion of the oxidation products vary considerably depending on the conditions under which the oxidation is carried out. Thus, during the oxidation of cyclohexane by air in the liquid phase and in the presence of metallic catalysts such as cobalt derivatives, cyclohexanol and cyclohexanone are principally obtained. It is known to remove at least a part of the by-products formed during the oxidation, before distilling the final products, by washing with water or alkaline solutions, either at the end of the oxidation or during or between the various phases of the oxidation. Alongside diacids such as succinic, glutaric and adipic acids, the aqueous wash solutions thus obtained contain hydroxycaproic acid and polymers derived therefrom which can be isolated or transformed by extraction or chemical treatment of these solutions, in accordance with known processes.

It is furthermore known that cyclohexane oxidation products can be obtained in which the proportion of cyclohexyl hydroperoxide in the oxidized products is relatively high if certain conditions for carrying out the process are observed. Among these, it has been proposed to conduct the oxidation without a catalyst, to allow the reagents a very short dwell time in the oxidizing equipment, to work at relatively low temperatures, with low degrees of conversion and in an apparatus which does not catalyse the decomposition of the hydroperoxides. Along these lines it has also been suggested to work in the presence of sequestring agents for metals and to treat the cyclohexane which is recycled to the oxidation zone with a basic reagent.

Despite these various measures, which undoubtedly contribute to increasing the yield of cyclohexyl hydroperoxide in the oxidation products, a large amount of by-products form during the oxidation. Among these by-products, only cyclohexanol, cyclohexanone and adipic acid have hitherto aroused interest because they are fundamental starting products for the chemical industry. Now, in view of the increasing importance assumed by the preparation of cyclohexane solutions of a cyclohexyl hydroperoxide, the utilization of the by-products which they contain, other than those quoted above, has become very important.

The present invention provides a process for producing 6-hydroperoxyhexanoic acid which comprises washing a solution of cyclohexyl hydroperoxide, obtained by oxidation of cyclohexane in the liquid phase without a metallic catalyst with a gas containing molecular oxygen, with water, separating the aqueous wash phase and extracting the 6-hydroperoxyhexanoic acid therefrom with a water-immiscible alcohol, ester or ketone.

Any cyclohexane oxidation product containing cyclohexyl hydroperoxide and prepared without a metallic catalyst can be treated by the new process, but the benefit derived from this treatment is the greater the higher the content of hydroperoxides in the oxidized product. The invention very particularly proposes the treatment of cyclohexane solutions of cyclohexyl hydroperoxide in which the oxidized products which are less volatile than cyclohexane contain at least 50% by weight of peroxidic products. Such solutions can be prepared by the process described in French Pat. No. 1,505,363 as well as by the first stage of the process described in U.S. Pat. No. 2,931,834. These solutions can be concentrated before washing, by using any known technique.

The wash with water is effected in the liquid phase at 5° to 100° C., preferably 15° to 30° C., where necessary under autogenous pressure, or under pressure created by an inert gas such as nitrogen if the temperature employed is above the boiling point of the water-cyclohexane azeotrope. The weight of water used generally represents 0.01 to 1 times, and preferably 0.05 to 0.5 times, the weight of solution to be washed. All the usual techniques for washing in the liquid phase can be used and the operation can be carried out equally well continuously or discontinuously.

After the aqueous wash phase has been separated, for example by decantation, part of the water can optionally be removed by evaporation, preferably under reduced pressure and at a temperature below 50° C. The degree of concentration may vary to a certain extent but it is generally of no value to attempt to obtain solutions containing more than 50% by weight of 6-hydroperoxyhexanoic acid. Following this partial removal of water, the diacids which precipitate in the concentrated aqueous solution, where appropriate after cooling, can be separated, for example by filtration.

According to another particular embodiment of the process, the small amounts of of cyclohexyl hydroperoxide, cyclohexanol and cyclohexanone, which the aqueous solution, which is optionally being concentrated, contains, can be extracted with a hydrocarbon which is liquid under the working conditions. It is for example possible to use aliphatic hydrocarbons, with five to 16 carbon atoms, alicyclic hydrocarbons with five to 8 carbon atoms in the ring, and benzene and monoalkylbenzenes or polyalkylbenzenes of which the alkyl groups have one to four carbon atoms. Cyclohexane is preferably employed, at a temperature between 15° and 30° C.

The alcohols which can be used for extracting the aqueous wash solutions, optionally treated as has just been stated, include alkanols with four to 10 carbon atoms, cycloalkanols with five to eight carbon atoms in the ring which are optionally substituted by one or more alkyl groups having one to four carbon atoms, and phenylalkanols having seven to 10 carbon atoms. As ketones which can be used, dialkyl ketones having four to 12 carbon atoms, cycloalkanones having five to eight carbon atoms in the ring and optionally substituted by alkyl groups having one to four carbon atoms, phenylalkyl ketones and cycloalkyl ketones having eight to 10 carbon atoms may be mentioned. Among the esters which can be used in the new process, those derived from alkylcarboxylic acid having two to eight carbon atoms and from alkanols having one to four carbon atoms are preferably chosen. Particular examples of extraction agents which meet the criteria enumerated above are ethyl acetate, amyl acetate, butyl propionate, methyl 2-ethylhexanoate, amyl alcohols, 2-ethylhexanol, 3-methyl-pentanol-2, the methylcyclohexanols, methyl ethyl ketone, methyl isobutyl ketone, cyclohexanone, acetophenone and methyl propyl ketone(pentanone-2).

The aqueous wash solutions are preferably extracted at 10° to 30° C. It is possible to carry out the process discontinuously, by stirring the mixture of aqueous solution and extraction agent and subsequently separating the two phases, or continuously, for example by trickling in a packed column or preferably in counter-current in a perforated plate column. The amount of extraction agent can vary within fairly wide limits without affecting the efficiency of the process but, as a general rule, weights of agent representing 0.5 to 5 times the weight of the aqueous wash solution to be extracted are very suitable.

After having separated off the aqueous layer, the organic solution of 6-hydroperoxyhexanoic acid can be used as it is for numerous purposes, optionally after drying, for example by contact with an inorganic salt which is inert towards the organic constituents of the solution. It is also possible to remove the solvent partly or wholly from the solution and this latter operation is advantageously carried out by heating to a temperature which is preferably below 50° C., under reduced pressure where appropriate.

The 6-hydroperoxyhexanoic acid can be used as a source of free radicals, especially in catalytic systems of the Redox type for the polymerization of ethylenic monomers, e.g. acrylonitrile, into the polymers of which it allows the residues carrying a carboxyl group to be introduced.

The Examples which follow illustrate the invention.

EXAMPLE 1

92 g. of water at 25° C. are added to 2,340 g. of a cyclohexane solution of hydroperoxides, obtained by oxidation of cyclohexane in the liquid phase, without a catalyst, with air of reduced oxygen content, followed by pre-concentration, and the mixture is stirred for about one minute. The aqueous phase is separated from the organic phase and this procedure is repeated twice more.

The aqueous solutions thus obtained are combined and twice extracted using 92 g. of cyclohexane each time. The aqueous solution, weighing 305.7 g. is retained. 40 g. of this aqueous solution is extracted three times at 25° C., each time using 14.4 g. of ethyl acetate, and the combined organic phases are then dried over sodium sulphate. After filtration, the solvent is evaporated by heating the solution to 30° C. under a pressure which is gradually reduced, the final pressure being 1 mm of mercury, and 4.6 g. of a pasty white solid remain. The results of studying this solid by infrared spectrography and by nuclear magnetic resonance (NMR) show that the structure of the essential constituent (75% measured by determination of the active oxygen) is that of 6-hydroperoxyhexanoic acid.

The cyclohexane solution of hydroperoxides employed was prepared by the process described in French Pat. No. 1,491,518, the degree of conversion on issuing from the last oxidizing equipment being 4.1%. The solution contains 21% by weight of oxidation products and 14.3% of hydroperoxides.

EXAMPLE 2

The experiment described in Example 1 is repeated but replacing the ethyl acetate by 14.5 g. of normal amyl alcohol. After evaporation of the solvent, 4.5 g. of a pasty solid finally remain, containing 3.5 g. of 6-hydroperoxyhexanoic acid, determined by analysis.

EXAMPLE 3

The experiment described in Example 1 is repeated, replacing the ethyl acetate by 14.5 g. of pentanone-2. Finally, after evaporation of the solvent, 4.8 g. of a pasty white solid remain containing 3.6 g. of hydroperoxyhexanoic acid determined by analysis.

The 6-hydroperoxyhexanoic acid was used in a catalytic system of the Redox type to prepare polyacrylonitrile with terminal carboxyl groups, following the procedure indicated below. 1,000 cm$^3$ of N/10 sulphuric acid, 70 g. of acrylonitrile and 1.29 g. of Mohr salt, followed by a few drops of concentrated sulphuric acid are introduced, with stirring, into a container wherein the air has been carefully replaced by nitrogen, and which is fitted with a stirrer and a reflux condenser. The mixture is heated to 75° C. and a solution of 1.3 g. of the pasty white solid obtained in Example 1, in 20 cm$^3$ of water, is then added. The final mixture is heated under reflux for 3 hours. The temperature is then 93° C. The polymer which has precipitated is filtered off and then washed 5 times with 500 cm$^3$ of boiling water. After filtering and drying at 70° C. under 15 mm of mercury, 49 g. of a white polymer are obtained of which an 0.2% strength solution in dimethylformamdie has a specific viscosity of 0.411 at 25° C.

We claim:

1. Process for producing 6-hydroperoxyhexanoic acid which comprises washing a solution of cyclohexyl hydroperoxide, obtained by oxidation of cyclohexane in the liquid phase without a metallic catalyst with a gas containing molecular oxygen, with water, separating the aqueous wash phase and extracting the 6-hydroperoxyhexanoic acid therefrom with a water-immiscible alcohol, ester or ketone selected from the group consisting of alkanols with four to 10 carbon atoms, cycloalkanols with five to eight carbon atoms in the ring which are optionally substituted by one or more alkyl groups having one to four carbon atoms, phenylalkanols having seven to 10 carbon atoms, dialkyl ketones having four to 12 carbon atoms, cycloalkanones having five to eight carbon atoms in the ring and optionally substituted by alkyl groups having one to four carbon atoms, phenylalkyl ketones and cycloalkyl ketones having eight to 10 carbon atoms and esters derived from an alkylcarboxylic acid having two to eight carbon atoms and an alkanol having one to four carbon atoms.

2. Process according to claim 1, in which the aqueous wash phase is extracted beforehand with a hydrocarbon which is liquid under the working conditions.

3. Process according to claim 1, in which the solution of cyclohexyl hydroperoxide contains at least 50% of peroxidic products less volatile than cyclohexane.

4. Process according to claim 1, in which the washing with water is effected at 15° to 30° C. the weight of water being 0.05 to 0.5 times the weight of the solution to be washed.

5. Process according to claim 1, in which the extraction with the alcohol, ester or ketone is effected at 10° to 30° C., using 0.5 to 5 times the weight of the aqueous wash solution.

6. Process according to claim 1, in which the said alcohol, ester or ketone is ethyl acetate, amyl acetate, butyl proprionate, methyl 2-ethylhexanoate, amyl alcohol, 2-ethyl-hexanol, 3-methyl-pentanol-2, methylcyclohexanol, methyl ethyl ketone, methyl isobutyl ketone, cyclohexanone, acetophenone, or methyl propyl ketone.

* * * * *